(12) United States Patent
Bianco et al.

(10) Patent No.: US 7,734,755 B1
(45) Date of Patent: Jun. 8, 2010

(54) INTERACTIVE DATA FAULT LOCALIZATION SYSTEM AND METHOD

(75) Inventors: Richard A. Bianco, Portsmouth, RI (US); Thomas Laureanno, Tiverton, RI (US); Felix A. Morales, Middletown, RI (US); Christopher A. Ekholm, Middletown, RI (US); Kevin C. Mattos, Middletown, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1140 days.

(21) Appl. No.: 11/328,487

(22) Filed: Jan. 5, 2006

(51) Int. Cl.
*G06F 15/173* (2006.01)
*H04L 12/28* (2006.01)
*H04L 12/56* (2006.01)
*G06F 15/177* (2006.01)
*G06F 17/30* (2006.01)

(52) U.S. Cl. .................... 709/223; 709/224; 370/395.1; 370/395.52; 715/736; 707/10

(58) Field of Classification Search ................. 709/223, 709/224; 370/395.1, 238.1, 395.52; 715/736; 707/10
See application file for complete search history.

(56) References Cited

U.S. PATENT DOCUMENTS

| | | | |
|---|---|---|---|
| 5,592,477 A * | 1/1997 | Farris et al. ................. 370/396 |
| 5,628,011 A * | 5/1997 | Ahamed et al. ............... 707/10 |
| 5,812,758 A | 9/1998 | Laureanno | |
| 6,225,994 B1 * | 5/2001 | Davis et al. ................. 715/733 |
| 6,501,950 B1 * | 12/2002 | Smith et al. ................. 455/423 |
| 6,513,129 B1 | 1/2003 | Tentij et al. | |
| 6,526,044 B1 * | 2/2003 | Cookmeyer et al. ......... 370/352 |
| 6,574,537 B2 | 6/2003 | Kipersztok et al. | |
| 6,606,744 B1 * | 8/2003 | Mikurak ..................... 717/174 |
| 6,904,449 B1 * | 6/2005 | Quinones .................... 709/203 |

* cited by examiner

*Primary Examiner*—Ranodhi N Serrao
(74) *Attorney, Agent, or Firm*—James M. Kasischke; Jean-Paul A. Nasser; Michael P. Stanley

(57) ABSTRACT

An interactive system is provided to help an operator locate the source of a data fault in an Asynchronous Transfer Mode (ATM) network. A database stores information related to data types and subsystems used by the ATM network. A processor coupled to the database uses the information stored therein to formulate a series of queries related to a selected one of the subsystems using the data type experiencing a data fault. The series of queries have a hierarchal order that sequentially inquire about operational status of the various subsystems having a relationship with the data type experiencing the data fault. A graphical user interface (GUI) coupled to the processor displays each query in accordance with the hierarchal order thereof. The GUI simultaneously displays identification of the various subsystems having a relationship with the data type experiencing the data fault.

12 Claims, 3 Drawing Sheets

INTERACTIVE DATA FAULT LOCALIZATION SYSTEM AND METHOD

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates generally to fault localization in Asynchronous Transfer Mode (ATM) networks, and more particularly to a stand-alone interactive data fault localization system and method that guides an ATM system operator through the fault localization process without having to be integrated into the ATM network.

(2) Description of the Prior Art

The localization of data faults in Asynchronous Transfer Mode (ATM) networks has previously required users to either (i) manually assemble information related to the connectivity or functionality of every data type and subsystem along an ATM network and then verify same, or (ii) use a tool that is integrated into the network itself. The manual approach can only be undertaken by an experienced network operator with extensive knowledge of the ATM network. Further, this operator must track all subsystem users and producers of a failed data type as the operator manually brings up/shuts down various points along the network in order to verify network connectivity. The information tracking and manual verification requires a lot of time and effort, and has a great potential for the introduction of human error.

Fault location tools that are integrated into the ATM network provide the means to systematically verify data point connectivity and functionality. However, because these tools are integrated into the network, they may be subject to malfunction when there is a network malfunction. Furthermore, the network-integrated tool is not portable.

SUMMARY OF THE INVENTION

Accordingly, it is an object of the present invention to provide a tool that helps an operator locate the source of data faults in an ATM network.

Another object of the present invention is to provide a portable and independent tool that can be coupled to an ATM network for localizing data faults in the network.

Other objects and advantages of the present invention will become more obvious hereinafter in the specification and drawings.

In accordance with the present invention, an interactive system is provided to help an operator locate the source of a data fault in an Asynchronous Transfer Mode (ATM) network having a plurality of subsystems and an ATM network server coupled to an ATM backbone. A database stores information related to a plurality of data types used by the ATM network. For each of the subsystems, the information includes a list of (i) ones of the data types used thereby, (ii) ones of the subsystems acting as a data server for the data types, and (iii) ones of the subsystems that produce the data types. A processor is coupled to the database and is adapted to be coupled to the ATM backbone. The processor uses the information in the database to formulate a series of queries related to a selected one of the subsystems using the data type experiencing a data fault. The series of queries have a hierarchal order that sequentially inquires about operational status of (i) the subsystem experiencing the data fault, (ii) other subsystems using the data type experiencing the data fault, (iii) the subsystems acting as a data server for the data type experiencing the data fault, and (iv) the subsystems that produce the data type experiencing the data fault. A graphical user interface (GUI) to include a display is coupled to the processor. The GUI presents on the display each query from the series of queries in accordance with the hierarchal order thereof. The GUI simultaneously presents on the display identification of (i) the subsystem experiencing the data fault, (ii) the data type experiencing the data fault, (iii) other subsystems using the data type experiencing the data fault, (iv) the subsystems acting as a data server for the data type experiencing the data fault, and (v) the subsystems that produce the data type experiencing the data fault.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
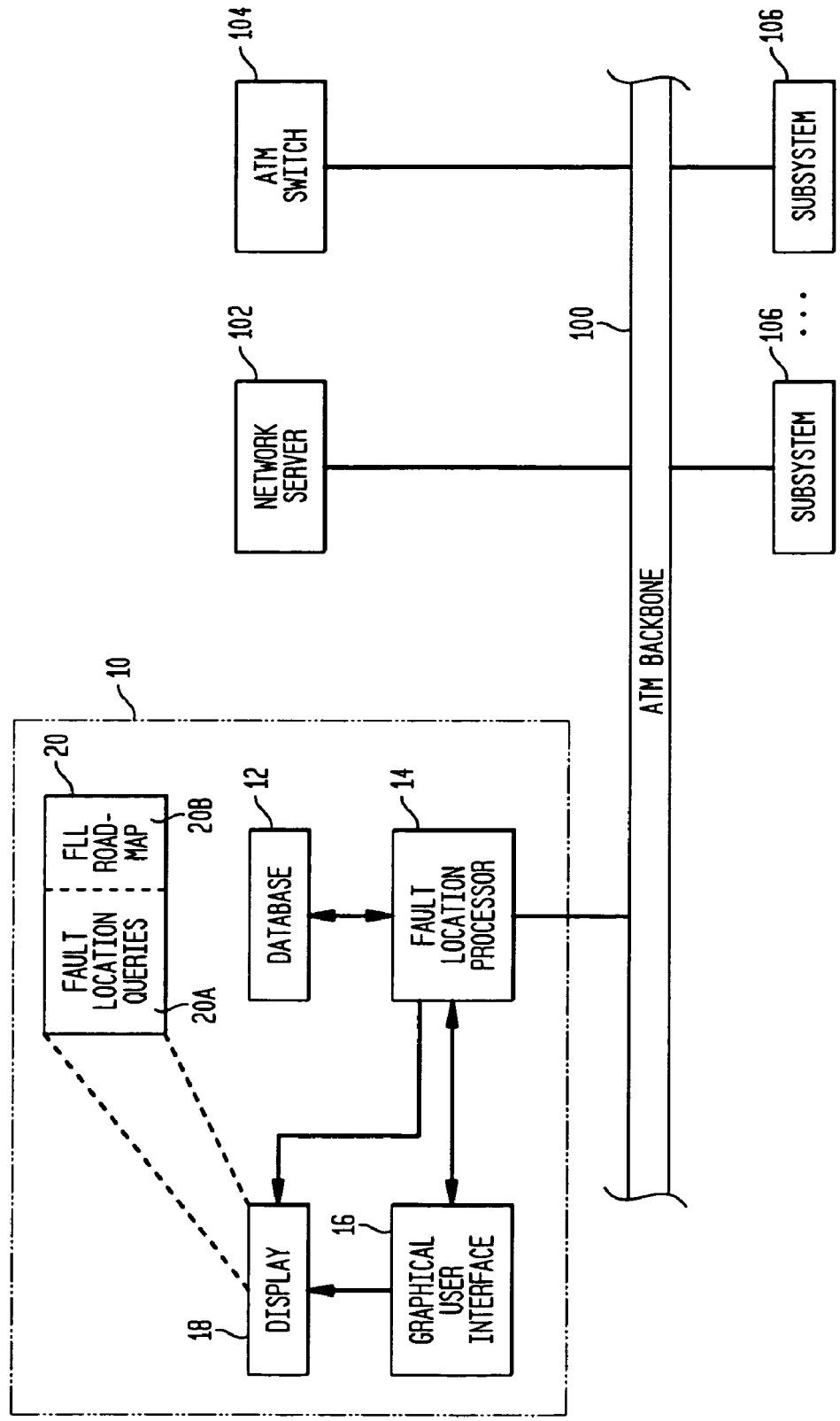
FIG. 1 is a block diagram of an interactive data fault localization system coupled to an Asynchronous Transfer Mode (ATM) network according to an embodiment of the present invention.

Referring now to the drawings, and more particularly to FIG. 1, a portion of an Asynchronous Transfer Mode (ATM) network is illustrated along with an interactive system 10 for helping a network operator locate the source of a data fault on the ATM network in accordance with the present invention. In general, interactive system 10 is a stand-alone system that presents an ordered set of questions or queries to the network operator. Each query directs the network operator to check/verify some aspect of the ATM network in an effort to find the source of a data failure while simultaneously tracking the fault location progress. Thus, interactive system 10 is a maintenance tool that can guide even an inexperienced network operator through a fault location process in an orderly and logical fashion. Further, since interactive system 10 is a stand-alone system, the fault location guidance provided thereby cannot be corrupted by idiosyncrasies of the ATM network or problems within the ATM network.

In general, an ATM network includes an ATM backbone 100, an ATM network server 102, an ATM switch 104, and a plurality of subsystems 106. As is well known in the art, ATM backbone 100 (e.g., a fiber optic backbone) provides the physical interconnection for each of, network server 102, switch 104, and subsystems 106. Subsystems 106 are connected together logically through switch 104 to emulate different local area networks or LANs. The interface definitions or logical connections associated with a data type can define certain ones of subsystems 106 as data consuming subsystems, data serving subsystems, or data producing subsystems. That is, for a given data type, data consuming subsystems associated with the data type are those subsystems that have the data type provided thereto for use thereby. Data serving subsystems associated with the data type are those subsystems that will receive the data produced by the data producing subsystems in total, or will receive data from multiple data producer subsystems, and combine the data into the complete data type for distribution (service) to the data consumers on the network. Data producing subsystems associated with the data type are the subsystems that generate the complete data set, or a partial data set that defines a data type. In some cases, the data producing subsystems can produce the entire data type and serve this data type to the data consumers. That is, in this situation, the subsystem acts as both a data server and a data producer.

Interactive system 10 is a stand-alone system that may be coupled to ATM backbone 100 when the source of a data fault must be localized. When system 10 is coupled to ATM backbone 100, some of the queries generated by system 10 can be automatically answered. However, if system 10 is not coupled to ATM backbone 100, the operator of system 10 must perform all operations specified on the displays presented by system 10 to answer the questions presented.

In terms of hardware, interactive system 10 includes a database 12, a fault location processor 14, and a graphical user interface (GUI) 16 having a display 18 coupled thereto for generating an image 20 viewable by an operator. The stand-alone nature of interactive system 10 can be achieved by realizing the hardware elements thereof using a portable computer such as a conventional laptop computer that can be coupled to ATM backbone 100.

Database 12 stores the logical connections and subsystem definitions associated with each data type of the ATM network. The logical connections and subsystem definitions serve as the basis of information used by interactive system 10. The information for each of subsystems 106 is essentially a list of the data types used by a particular subsystem and a list of the ones of subsystems 106 that produce the particular subsystem's data types. The information stored in database 12 can be arranged in a variety of ways well known in the art without departing from the scope of the present invention. For example, the information can be formatted to be queried using commercially-available Standard Query Language (SQL) software.

The information stored in database 12 is accessed by fault location processor 14 that, in general, is programmed to formulate a series of queries that guide the network operator through a fault localization process after there is a failure of a data type used by the ATM network. Such failure can be defined by, for example, no data, data outside of acceptable ranges, etc. More specifically, fault location processor 14 is programmed with a generic series of questions arranged in a hierarchal order such that the first question in the series is presented before the second question in the series, etc. In the present invention, questions at the top of the hierarchal order are related to the operational status of the one of subsystems 106 experiencing the effect of the data failure of a data type thereof. On the next rung of the hierarchal order are questions related to the operational status of those of subsystems 106 that also use the data type experiencing the data fault. Next are questions relating to the operational status of those of subsystems 106 acting as data servers for the data type experiencing the data fault. Finally, on the lower end of the hierarchal order are questions relating to the operational status of those of subsystems 106 that produce the data type experiencing the data fault. The logic of the hierarchal order of questions will be explained further below.

If the source of the data fault has not been located by the time the above-described hierarchal-ordered questions have been answered, it can be assumed that subsystems 106 (i.e., data consumers, data servers, and data producers) are operationally sound. At this point, the operator can move on to an investigation of the operation of network server 102 and ATM switch 104. Typical problems of these systems include, for example, excessive network server CPU loading, network throughput bottlenecks, and previously-recognized network anomalies.

GUI 16 is essentially the user' interface between the network operator and fault location processor 14. Typically, GUI 16 is implemented by a keyboard and/or mouse as would be well understood in the art. GUI 16 is used by the network operator to (i) initiate the fault location logic for a particular data type, and (ii) step through the series of operational status queries described above. Each such query is displayed on a region of display 20 as represented by fault location queries region 20A. At the same time, another region of display 20 shows what will be referred to herein as a "fault location logic (FLL) roadmap" 20B.

Figure 2:
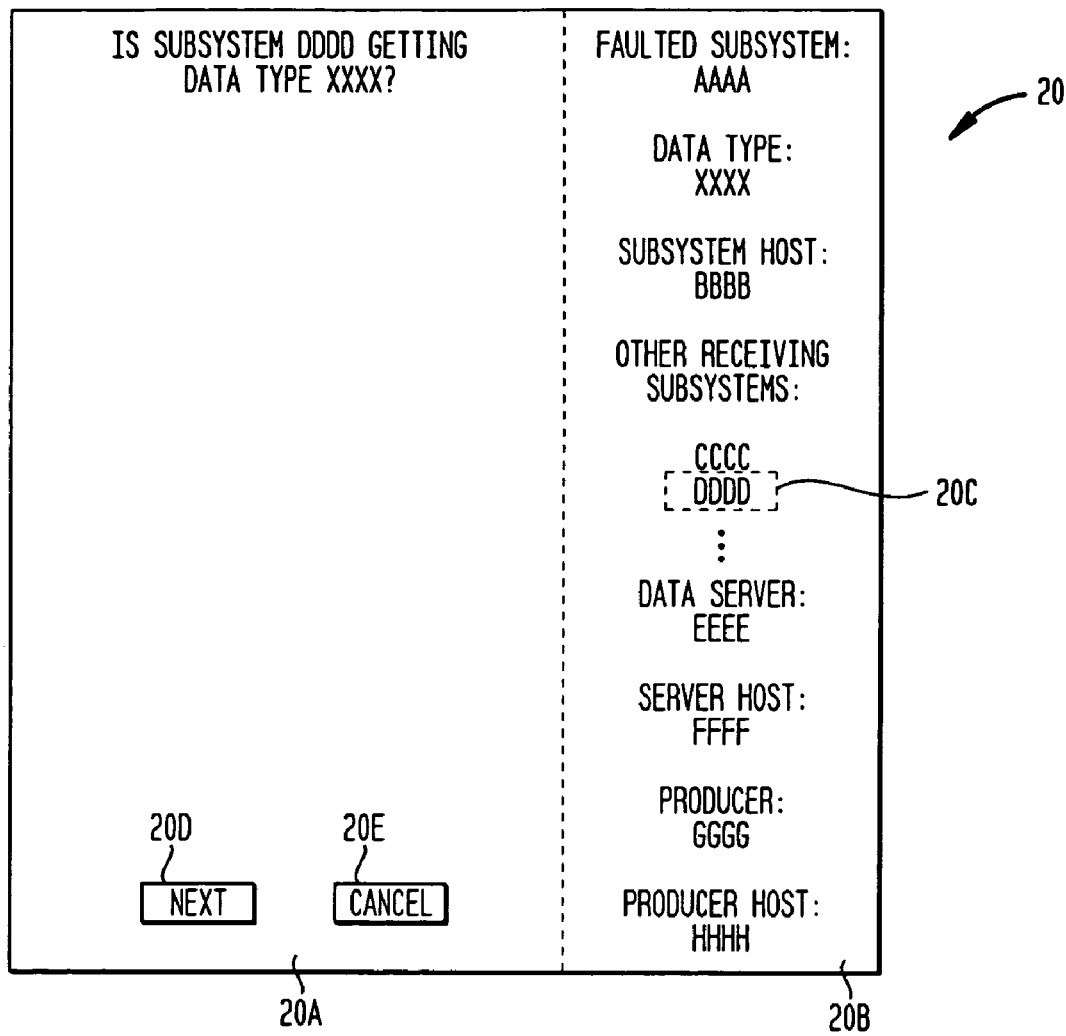
FIG. 2 is an example of a display to include a query display region and a fault location logic roadmap region in accordance with the present invention.

FLL roadmap 20B presents the network operator with a snapshot of the fault location logic associated with locating the source of the failure of a particular data type. That is, FLL roadmap 20B displays the logical connections associated with the data type experiencing the data fault. An example of what a typical FLL roadmap 20B might look like is illustrated in FIG. 2 where the data type experiencing a failure is indicated as "XXXX". It has been found that positioning roadmap 20B on the rightmost side of display 20 provides a user with an easily-viewed, logical snapshot of the fault location logic. Further, the columnar form of roadmap 20B presents the fault location logic in a "top down" format in accordance with the hierarchal order of the questions that will be presented in region 20A. This allows an experienced network operator that understands the design of the ATM network, but may not be familiar with this particular data fault, to shorten the fault location process by "jumping ahead" to a suspected fault location and continue the investigation from that point.

With the network operator specifying (to processor 14) that data type XXXX is failed, fault location processor 14 makes calls to database 12 where the list of subsystems, etc., associated with data type XXXX are stored. The listed information for data type XXXX is presented on display 20 in a columnar form as roadmap 20B. The various subsystems are identified sequentially in the column in essentially the same order as the hierarchal order of the operational status queries described above. Accordingly, the top of roadmap 20B identifies the faulted subsystem (i.e., the subsystem where the failure of data type XXXX was detected) as "AAAA". Next, roadmap 20B identifies the AAAA subsystem's host as "BBBB" in the illustrated example. Below this, any one or more subsystems that also use failed data type XXXX (e.g., "CCCC" and "DDDD" in the illustrated example) are listed. Next, the data server subsystem(s) (e.g., "EEEE") for data type XXXX is identified followed by, if applicable, the server's host (e.g., "FFFF"). Finally, producer subsystems (e.g., "GGGG") and producer host subsystems (e.g., "HHHH") associated with failed data type XXXX are listed on roadmap 20B. In this way, the network operator is presented with an immediate snapshot of the direction that the fault location logic will take via the series of queries that will appear at region 20A.

Roadmap 20B is presented on display 20 throughout the fault location process. In addition, the location of a particular query (i.e., noted in region 20A) can be highlighted on roadmap 20B so that the network operator can quickly tell which stage they are in the above-described hierarchal order of operational status queries. For example, if the operational status query in 20A was as follows: "Is subsystem DDDD getting data type XXXX?", then the listing of DDDD would be highlighted as indicated by dashed line box 20C.

When the network operator is able to answer the current query appearing at region 20A, the network operator can continue to the next query by clicking on "NEXT" button 20D. If the network operator's observations in response to the current query provide the data fault source (e.g., subsystem DDDD), the network operator can' quit interactive system 10 by clicking on "CANCEL" button 20E.

Figure 3:
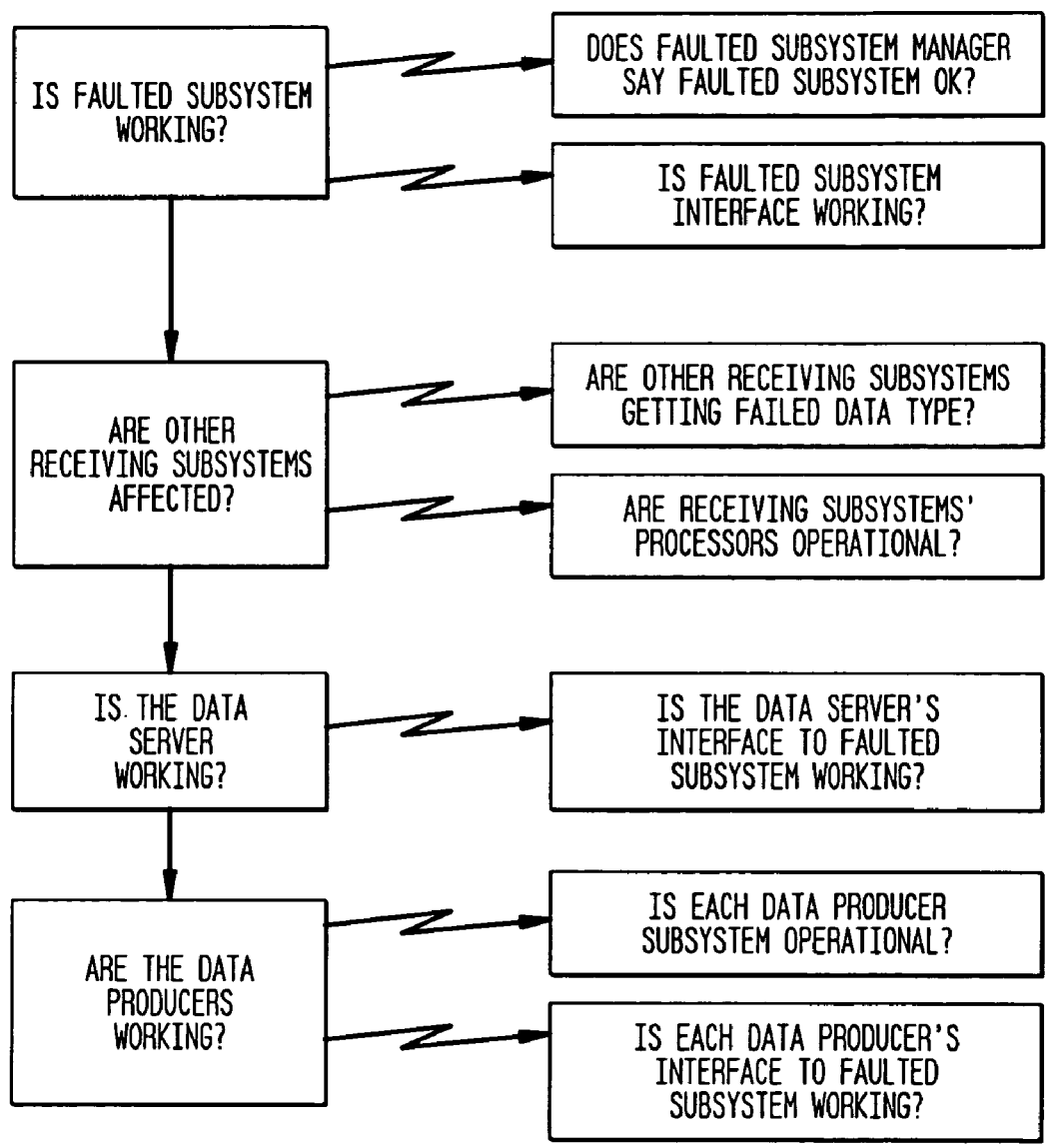
FIG. 3 is a flowchart illustrating the general format and hierarchal order of the operational status queries presented in accordance with the present invention.

As mentioned above, the logic of the hierarchal order of operational status queries follows a general format illustrated in flowchart form in FIG. 3 where the left side of the flow chart depicts the general nature of the queries and the right side of the flow chart depicts possible specific queries. The network operator's answers and/or observations in response to the queries will direct him to the source of the data fault. Note that the top-to-bottom flow illustrated in FIG. 3 follows the above-described hierarchal order.

The advantages of the present invention are numerous. Both inexperienced and experienced network operators can use the interactive system/method to locate the source of a data fault in an ATM network. The system is stand-alone and is, therefore, insulated from ATM network problems or malfunctions.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. An interactive system for helping an operator locate the source of a data fault in an Asynchronous Transfer Mode (ATM) network having a plurality of subsystems and an ATM network server coupled to an ATM backbone, said system comprising:
   a database for storing information related to a plurality of data types used by the ATM network wherein, for each of said subsystems, said information includes a list of (i) ones of said data types used thereby, (ii) ones of said subsystems acting as a data server for said data types, and (iii) ones of said subsystems that produce said ones of said data types;
   a central processing unit coupled to said database and adapted to be coupled to the ATM backbone, said central processing unit using said information in said database to formulate a series of queries related to a selected one of said subsystems using one of said data types experiencing said data fault, said series of queries having a hierarchal order that sequentially inquires about operational status of (i) said selected one of said subsystems, (ii) others of said subsystems using said one of said data types experiencing said data fault, (iii) said ones of said subsystems acting as said data server for said one of said data types experiencing said data fault, and (iv) said ones of said subsystems that produce said one of said data types experiencing said data fault; and
   a graphical user interface (GUI) to include a display coupled to said central processing unit, said GUI presenting on said display each query from said series of queries in accordance with said hierarchal order thereof, said GUI simultaneously presenting on said display identification of (i) said selected one of said subsystems, (ii) said one of said data types experiencing said data fault, (iii) others of said subsystems using said one of said data types experiencing said data fault, (iv) said ones of said subsystems acting as said data server for said one of said data types experiencing said data fault, and (v) said ones of said subsystems that produce said one of said data types experiencing said data fault.

2. An interactive system as in claim 1 wherein said central processing unit accesses said information in said database by making calls to said database in Standard Query Language (SQL).

3. An interactive system as in claim 1 wherein said identification of one of
   (i) said selected one of said subsystems;
   (ii) said one of said data types experiencing said data fault;
   (iii) others of said subsystems using said one of said data types experiencing said data fault;
   (iv) said ones of said subsystems acting as said data server for said one of said data types experiencing said data fault; and
   (v) said ones of said subsystems that produce said one of said data types experiencing said data fault, is highlighted on said display as ones of said series of queries addressing the operational status thereof are presented on said display.

4. An interactive system as in claim 1 wherein said identification of
   (i) said selected one of said subsystems;
   (ii) said one of said data types experiencing said data fault;
   (iii) others of said subsystems using said one of said data types experiencing said data fault;
   (iv) said ones of said subsystems acting as said data server for said one of said data types experiencing said data fault; and
   (v) said ones of said subsystems that produce said one of said data types experiencing said data fault, is presented on said display in a column adjacent said series of queries presented on said display.

5. An interactive system as in claim 4 wherein said column is located on the right side of said display.

6. An interactive system as in claim 1 wherein said database, said central processing unit and said GUI are maintained on a portable computer adapted to be coupled to the ATM backbone.

7. A method of interactively helping an operator locate the source of a data fault in an Asynchronous Transfer Mode (ATM) network having a plurality of subsystems and a network server coupled to an ATM backbone, said method comprising the steps of:
   storing information related to a plurality of data types used by the ATM network in a database wherein, for each of said subsystems, said information includes a list of (i) ones of said data types used thereby, (ii) ones of said subsystems acting as a data server for said data types, and (iii) ones of said subsystems that produce said ones of said data types;
   formulating a series of queries using said information related to a selected one of said subsystems that uses one of said data types experiencing said data fault, said series of queries having a hierarchal order that sequentially inquires about operational status of (i) said selected one of said subsystems, (ii) others of said subsystems using said one of said data types experiencing said data fault, (iii) ones of said subsystems acting as said data server for said one of said data types experiencing said data fault, and (iv) said ones of said subsystems that produce said one of said data types experiencing said data fault; and simultaneously presenting on a display each query from said series of queries in accordance with said hierarchal order thereof and identification of (i) said selected one of said subsystems, (ii) said one of said data types experiencing said data fault, (iii) others of said subsystems using said one of said data types experiencing said data fault, (iv) said ones of said subsystems acting as said data server for said one of said data types experiencing said data fault, and (v) said ones of said subsystems that produce said one of said data types experiencing said data fault.

8. A method according to claim 7 wherein said information in said database is accessed by making calls to said database in Standard Query Language (SQL).

9. A method according to claim 7 further comprising the step of highlighting on said display said identification of one of
   (i) said selected one of said subsystems;
   (ii) said one of said data types experiencing said data fault;
   (iii) others of said subsystems using said one of said data types experiencing said data fault;
   (iv) said ones of said subsystems acting as said data server for said one of said data types experiencing said data fault; and
   (v) said ones of said subsystems that produce said one of said data types experiencing said data fault, as ones of said series of queries addressing the operational status thereof are presented on said display.

10. A method according to claim 7 wherein said step of presenting said identification of
   (i) said selected one of said subsystems;
   (ii) said one of said data types experiencing said data fault;
   (iii) others of said subsystems using said one of said data types experiencing said data fault;
   (iv) said ones of said subsystems acting as said data server for said one of said data types experiencing said data fault; and
   (v) said ones of said subsystems that produce said one of said data types experiencing said data fault, is carried out on said display in a column adjacent said series of queries presented on said display.

11. A method according to claim 10 wherein said column is located on the right side of said display.

12. A method according to claim 7 wherein said steps of storing, formulating and presenting are carried out on a portable computer adapted to be coupled to the ATM backbone.

* * * * *